(12) United States Patent
Jiang et al.

(10) Patent No.: US 11,635,481 B2
(45) Date of Patent: Apr. 25, 2023

(54) STELLAR ATMOSPHERIC REFRACTION MEASUREMENT CORRECTION METHOD BASED ON COLLINEARITY OF REFRACTION SURFACES

(71) Applicant: BEIJING UNIVERSITY OF AERONAUTICS AND ASTRONAUTICS, Beijing (CN)

(72) Inventors: Jie Jiang, Beijing (CN); Zhen Wang, Beijing (CN); Guangjun Zhang, Beijing (CN)

(73) Assignee: BEIJING UNIVERSITY OF AERONAUTICS AND ASTRONAUTICS, Beijing (CN)

( * ) Notice: Subject to any disclaimer, the term of this patent is extended or adjusted under 35 U.S.C. 154(b) by 0 days.

(21) Appl. No.: 17/750,387

(22) Filed: May 22, 2022

(65) Prior Publication Data

US 2022/0276332 A1    Sep. 1, 2022

Related U.S. Application Data

(63) Continuation of application No. PCT/CN2021/099954, filed on Jun. 15, 2021.

(51) Int. Cl.
*G01S 3/786* (2006.01)

(52) U.S. Cl.
CPC ................. *G01S 3/7867* (2013.01)

(58) Field of Classification Search
CPC .................................................. G01S 3/7867
USPC ........................................................ 702/92
See application file for complete search history.

(56) References Cited

U.S. PATENT DOCUMENTS

| 8,767,072 B1 * | 7/2014 | Rosenwinkel ....... G06V 10/751 348/148 |
| 2021/0108922 A1 * | 4/2021 | Dawson ................ F41G 7/2293 |

* cited by examiner

*Primary Examiner* — Aditya S Bhat

(57) ABSTRACT

A stellar atmospheric refraction measurement correction method based on collinearity of refraction surfaces, comprising: performing star identification on the basis of observed star vectors in a star sensor and the reference star catalog, to obtain matching relationships between observed stars and reference stars; converting reference star vectors corresponding to the observed stars to a geographic coordinate system before entering the atmosphere to obtain zenith distances and azimuth angles of incident stellar; on the basis of a principle of collinearity of refraction surfaces, performing optimal solving according to imaging coordinates of observation stars, to obtain the optimal position coordinates of the zenith direction on an imaging surface of the star sensor; according to the optimal zenith direction, performing atmospheric refraction correction on all the recognized observed stars by means of the trigonometric cosine formula to obtain corrected star coordinates; and performing optimal solving to obtain the attitude of the star sensor in the geographic coordinate system.

6 Claims, 3 Drawing Sheets

STELLAR ATMOSPHERIC REFRACTION MEASUREMENT CORRECTION METHOD BASED ON COLLINEARITY OF REFRACTION SURFACES

CROSS REFERENCE

The present disclosure claims priority to Chinese Patent Application No. 202010564011.8, titled "STELLAR ATMOSPHERIC REFRACTION MEASUREMENT CORRECTION METHOD BASED ON COLLINEARITY OF REFRACTION SURFACES" and filed on Jun. 19, 2020, the entire contents of which are incorporated herein by reference.

TECHNICAL FIELD

The invention relates to a stellar atmospheric refraction measurement and correction method based on refractive surface collinear, and belongs to the technical field of star-sensor atmospheric refraction correction.

BACKGROUND

As an important factor affecting the altitude measurement accuracy of ground-based star sensors, the influence of atmospheric refraction on incident stellar is a key issue that restricts ground observation star sensors to obtain high attitude measurement accuracy. Although astronomers have done a lot of research on stellar atmospheric refraction in the past few decades, the real-time and high-precision stellar atmospheric refraction correction in practical applications has not been effectively solved.

There are two main types of atmospheric refraction correction methods. The first type is the atmospheric refraction fitting model correction method based on the theoretical uniformly layered spherical atmospheric model. This method believes that the entire atmosphere is isotropic and the density of each layer is uniform, so the environmental parameters of the observation position can be used to replace the environmental parameters (pressure, temperature, relative humidity, etc.) of the stellar transmission path in the entire atmosphere, and then the atmospheric refraction model can be derived. The second category is the look-up table method based on statistics. This method calculates the atmospheric refraction angles of various angles obtained by the local observatory using high-precision observation astronomical equipment such as low-latitude meridian rings for a long time in one year, and then makes the atmospheric refraction table. In practical applications, atmospheric refraction correction is accomplished through look-up table and uniform spherical atmospheric model correction. For example, "Chinese Astronomical Calendar", Pulkovo Atmospheric Refraction Table, etc.

However, these existing astronomical methods cannot effectively accomplish real-time atmospheric refraction correction for ground-based star sensors. Both the look-up table method and the atmospheric theoretical model method have the following shortcomings. First of all, the refractive index of each incident direction in the actual earth's atmosphere is different, so the theoretical uniform layered spherical atmosphere model is difficult to satisfy the isotropic and uniform properties of the medium, and the accuracy of atmospheric refraction correction in practical application is difficult to guarantee. Secondly, these methods all need to use other instruments to measure the propagation environment of stellar in the atmosphere, such as temperature, pressure, humidity, etc. These instruments add their measurement errors to the correction results in the process of correcting the atmospheric refraction of stellar, which will affect the Accuracy of atmospheric refraction correction. Finally, these methods do not have the ability to correct the atmospheric refraction of multiple stars in real time with high accuracy for changing observation positions.

SUMMARY

The present disclosure provides a flipping mechanism, a sorting robot, and a device. By arranging a revolute pair assembly, flexibility of the flipping mechanism may be increased. Therefore, the present disclosure has a better application prospect.

The technical solution of the invention is to overcome the deficiencies of the prior art and provide a method for measuring and correcting the atmospheric refraction of stellar based on the collinearity of the refraction surfaces, which can complete the atmospheric refraction correction of any position of the ground-based star sensor in real time with high precision, and is not affected by the atmosphere inside the atmosphere, influence of environmental factors.

The technical solution of the present invention: a method for measuring and correcting stellar atmospheric refraction based on collinear refraction surfaces, characterized in that it comprises the following steps:

Step 1; based on a star identification method, obtaining a matching relationship between an observation star in the star sensor and a reference star in a reference star catalogue according to the position coordinates of the observation star on the imaging plane of the star sensor and the reference star catalogue:

Step 2, according to the first star identification result and the observation time and the observation position, converting the direction vector of the reference star corresponding to the observation star in the star sensor from the reference star coordinate system into a geographic coordinate system before entering the atmosphere layer, ie, the East-North-Up coordinate system, to obtain the zenith distance-altitude and the azimuth angle before entering the atmosphere layer;

Step 3, based on the stellar atmospheric refraction surface collinear principle According to the position coordinates of the observed star on the imaging plane of the star sensor and the azimuth angle of the stellar obtained in the second step before entering the atmosphere layer, the position coordinates of the top direction of the earth on the imaging surface of the star sensor are solved;

Step 4, performing atmospheric refraction correction on the coordinates of all the observation stars in the star sensor on the imaging plane after the star is identified according to the position coordinates of the earth top direction obtained in the third step and the sky top distance before the stellar obtained in the second step enters the atmosphere layer, so as to obtain theoretical position coordinates of all observed stars on the imaging surface of the star sensor after the atmospheric refraction is removed;

Step 5, according to the calculated theoretical position coordinates of all the observation stars on the imaging surface of the star sensor after the atmospheric retraction is removed in the fourth step, the matching relationship between the star and the reference star in the first step, and the direction vector of the reference star in the geographic coordinate system in the second step, the attitude of the star sensor in the geographic coordinate system is solved.

Wherein in the first step, the star identification implementation steps are as follows:

(a1) setting the position coordinates of the ith observation star on the imaging surface of the star sensor as $A_i(x_A, y_A)$, and obtaining an observation star vector of the observation star in the star sensor coordinate system according to the optical parameters of the star sensor, namely the size, the focal length and the main point of the star sensor $\overline{O_sA_i}$, wherein OS is the origin of the star sensor coordinate system;

(a2) Observing the inter-satellite angular distance between two observation star vectors based on the star identification method, and matching them with the reference angular distance formed by the reference star in the reference star catalogue to obtain the matching relationship between the observation star in the star sensor and the reference star in the reference star catalogue.

Wherein in the second step, the altitude zenith distance and the azimuth angle of the incident stellar before entering the atmosphere layer are implemented as follows:

(b1) obtaining the observation time of the star sensor and the longitude and latitude of the observation position, and converting the observation time to the earth mechanics time;

(b2) taking out the position vector of the reference star matched with the observation star in the star sensor from the reference star table according to the result of the first star identification and the related astronomical parameters thereof, wherein the astronomical parameters comprise the red warp, the red weft, the sun and the parallax;

(b3) based on the International Astronomical Union (IAU) basic Standards of Fundamental Astronomy (SOFA), observing the observation time and the observation position and substituting the reference star position vector and the related astronomical parameters of the star into an astronomical conversion formula, and calculating to obtain a position vector of the reference star matched with the observation star in the star sensor in a geographic coordinate system, ie, the East-North-Up coordinate system, before entering the atmosphere layer, wherein the vector is represented by the antenna top distance and the azimuth angle.

Wherein the third step, the steps of obtaining the position coordinates of the zenith direction of the earth on the imaging plane of the star sensor are as follows:

(c1) setting the theoretical position coordinates of the top direction of the earth on the imaging surface of the star sensor as $B(x_B, y_B)$, and obtaining the direction vector of the top direction of the earth in the star sensor coordinate system according to the optical parameters, namely the size, the focal length and the main point of the star sensor $\overline{O_sB}$;

(c2) the ith observed star vector $\overline{O_sA_i}$ in the star sensor and the direction vector $\overline{O_sB}$ of the earth's zenith form the atmospheric refraction surface $O_sA_iB$, the vector of the refraction surface method is $\overline{FA_i}=\overline{O_sA_i}\times\overline{O_sB}$, the atmospheric refraction surfaces of different stars in the star sensor intersect with the earth's zenith direction vector $\overline{O_sB}$, that is, the refraction face collinear;

(c3) the angle between the atmospheric refraction surfaces $O_sA_iB$ and $O_sA_jB$ of the i-th observed star and the j-th observed star in the star sensor is equal to the angle between their normal vectors, since the azimuth angle does not change before and after the atmospheric refraction of the stellar, the angle between the normal vectors of the atmospheric refraction surfaces $O_sA_iB$ and $O_sA_jB$ is equal to the angle between the azimuth angles before the observed stars i and j enter the atmosphere, namely: a $\cos(\overline{FAi}\cdot\overline{FAj}/|\overline{FAj}||\overline{FAj}|)=\theta_{Azimuth,Ai}-\theta_{Azimuth,Aj}$, where $\theta_{Azimuth,Ai}$ and $\theta_{Azimuth,Aj}$ are azimuth angles of the observed stars i and j before they enter the atmosphere obtained in the second step;

(c4) any three observation stars in the star sensor form a refraction surface triangle, and the refractive surface triangles form a least square error model, namely, $$\sum_{i=j=1}^{3}\left\|\text{acos}(\overline{FAi}\cdot\overline{FAj}/|\overline{FAj}||\overline{FAj}|)-(\theta_{Azimuth,Ai}-\theta_{Azimuth,Aj})\right\|_2^2;$$

(c5) all observed stars in the star sensor form $C_N^3$ groups of refracting triangles, where N is the number of observed stars identified after star recognition, the least squares error model of all the refractive surface triangles in the star sensor is accumulated to obtain a position coordinate solving model of the top direction of the earth on the imaging surface of the star sensor, that is, $$(\overline{x_B}, \overline{y_B}) = \arg\min\sum_{n=1}^{M}\left(\sum_{i\neq j=1}^{3}\left\|\text{acos}(\overline{FAi}\cdot\overline{FAj}/|\overline{FAj}||\overline{FAj}|)-(\theta_{Azimuth,Ai}-\theta_{Azimuth,Aj})\right\|_2^2\right),$$

in the formula $M_N^3$; Finally, theoretical position coordinates of the optimal earth top direction of the whole star image on the imaging surface of the star sensor are obtained $\overline{B}(\overline{x_B}, \overline{y_B})$.

Wherein the fourth step, an observation sun in the star sensor is subjected to atmospheric refraction correction to obtain theoretical position coordinates of all observed stars on the imaging surface of the star sensor after the atmospheric refraction is removed, and the steps are as follows:

(d1) the azimuth angle of the i-th observation sun on the imaging surface of the star sensor is $A_i(x_A, y_A)$ and the position coordinates after atmospheric refraction correction are the same as the azimuth angle of the $A'_i(x'_A, y'_A)$, on the imaging surface of the star sensor, the position coordinates $A_i(x_A, y_A)$, $A'_i(x'_A, y'_A)$ and the theoretical position coordinates $B(x_B, y_B)$ on the imaging plane of the star sensor are collinear, that is, $\overline{BA_i}\cdot\overline{BA'_i}=0$;

(d2) setting the top distance of the i-th observation star on the imaging surface of the star sensor in the second step as $\theta_{Zenith,Ai}$, and according to the cosine theorem $|A_iA'_i|^2=|O_sA_i|^2+|O_sA'_i|^2-2|O_sA_i||O_sA'_i|\cos(\theta_{Zenith,Ai}-\angle BO_sA_i)$;

(d3) the above-mentioned implementation steps (d1) and (d2) are combined to form a system equation set, and theoretical position coordinates $A'_i(x'_A, y'_A)$ of the observation sun i on the imaging surface of the star sensor after the atmospheric refraction is removed are solved:

(d4) atmospheric refraction correction is carried out on other observation stars in the star sensor according to steps (d1), (d2) and (d3), so that theoretical position coordinates after atmospheric refraction are removed.

wherein the fifth step of solving the attitude of the star sensor in the geographic coordinate system comprises the following steps:

(e1) obtaining the direction vector of the star i under the star sensor coordinate system after atmospheric refraction correction according to the optical parameters of the star sensor, namely the size, the focal length and the main point of the star sensor $O_sA'_i$;

(e2) obtaining the attitude of the star sensor in the geographic coordinate system by using the attitude solving method according to the matching relationship between the observation star in the star sensor in the first step and the reference star in the reference star table and the position vector before the reference star enters the atmosphere in the geographic coordinate system in the second step.

The advantages of the present invention compared with the prior art are:

(1) There are three main disadvantages of the existing technology. First, the existing technologies are all based on the theoretical uniformly stratified spherical atmospheric model. However, the refractive index of each incident direction in the actual earth's atmosphere is different, so it is difficult to satisfy the isotropic and uniform properties of the theoretical uniform layered spherical atmosphere model. Secondly, the existing technologies all require the help of other measuring instruments, and these instruments add their measurement errors to the correction results during the correction of stellar atmospheric refraction, thus affecting the accuracy of atmospheric refraction correction, Finally, the existing technology does not have the ability to correct the atmospheric refraction of the multi-stellar atmosphere constantly changing the observation position in real time. The present invention is applied to the stellar atmospheric refraction correction of the star sensor in the atmosphere, and realizes the real-time correction of the position coordinates of all identified stars during the observation process of the star sensor, thereby obtaining accurate attitude information of the star sensor;

(2) The present invention does not rely on the theoretical uniform layered spherical atmospheric model, the solution process has nothing to do with the propagation trajectory of the stellar in the atmosphere, and directly solves the imaging coordinates of the stellar in the star sensor to complete the atmospheric refraction correction;

(3) The present invention does not need to rely on its atmospheric environment parameter measuring instrument, and the star sensor itself completes the atmospheric refraction correction;

(4) The invention has the ability to correct the atmospheric refraction of multiple stars that constantly change the observation position in real time with high precision;

(5) All the above-mentioned, advantages of the present invention are due to the fact that the present invention does not take the atmospheric refraction trajectory of a single star as the focus for atmospheric refraction correction; but considers the relationship between the atmospheric refraction surfaces of multiple stars to achieve star sensitivity. Atmospheric refraction correction for attitude measurements in the detector. Based on the principle that the refraction surfaces of multiple stars are collinear, the atmospheric refraction correction process does not need to consider the atmosphere's internal environment (temperature, pressure, humidity, etc.) and the specific propagation trajectories of stellar in the atmosphere, so as to obtain high atmospheric refraction correction accuracy.

DETAILED DESCRIPTION

The present invention will be described in detail below with reference to the accompanying drawings and embodiments.

Figure 1:
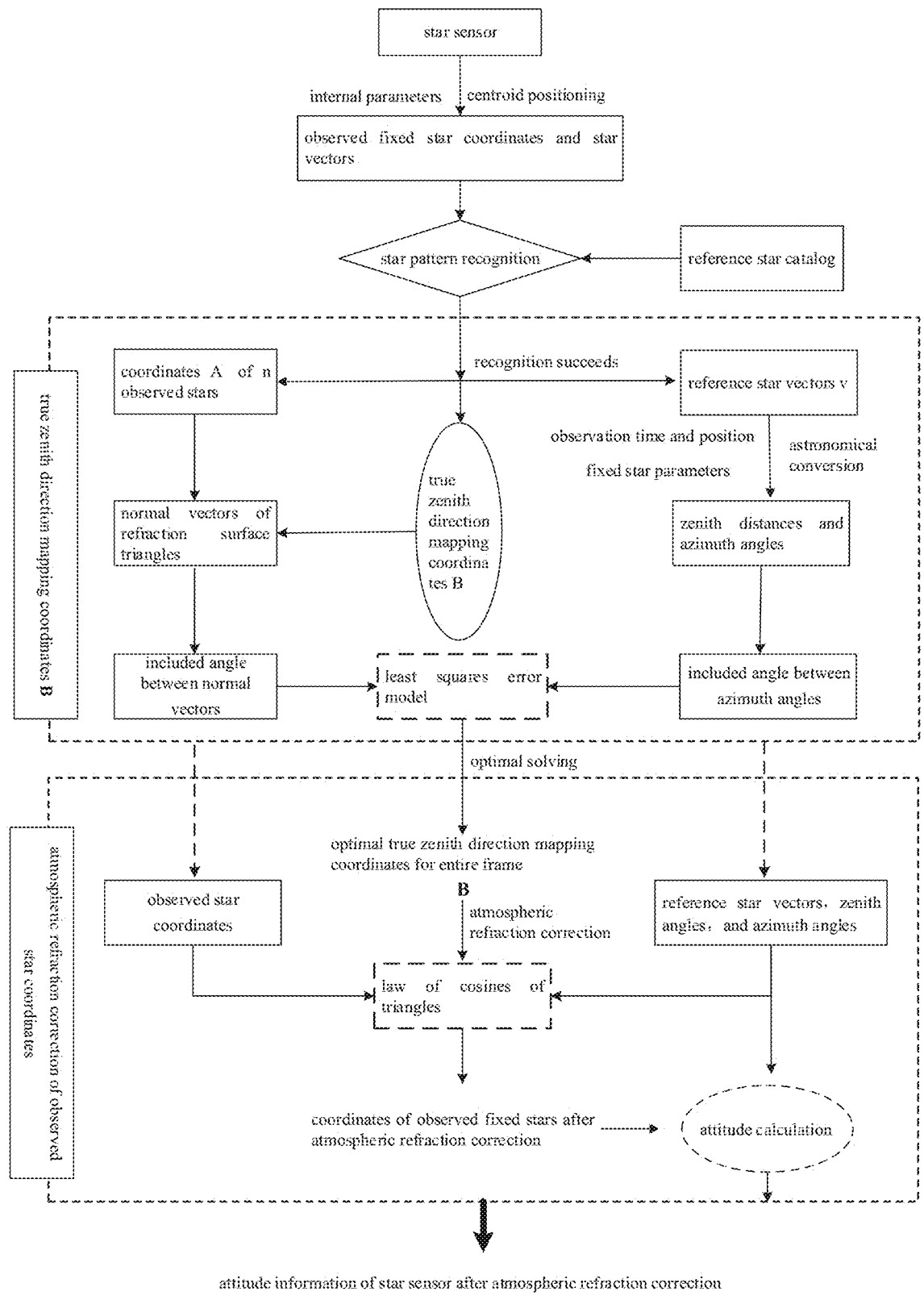
FIG. 1 is the realization flow chart of the method of the present invention.

As shown in FIG. 1, the present invention proposes a real-time atmospheric refraction correction measurement method based on the collinearity of refracting surfaces. The method is based on the coplanarity of atmospheric refraction, that is, atmospheric refraction only changes the zenith angle of incident light without affecting its incident azimuth. Based on this, different observed stars in the star sensor have their own atmospheric refraction surfaces. Without considering other errors, the atmospheric refraction surfaces of all observed stars intersect on a straight line, that is, the zenith direction of the earth at the observation time and observation position of the star sensor.

Although the pressure, temperature, humidity and other factors at various positions of the stellar's trajectory through the atmosphere will affect the atmospheric refraction changes, they are always in a refraction plane. Therefore, the atmospheric refraction correction process based on the collinearity of the refracting surfaces has nothing to do with the propagation trajectory of stellar in the atmosphere, and its refraction correction accuracy will not be affected by the atmosphere's internal environment (temperature, pressure, humidity, etc.) and the refraction trajectory during the actual observation process.

First, it is assumed that the position coordinate of the i-th observed star on the imaging surface of the star sensor is $A_i(x_{Ai}, y_{Ai})$. According to the optical parameters of the star sensor, that is, the pixel size, focal length and principal point, the observed star vector $\overline{O_s A_i}$ of the observed star in the star sensor coordinate system is obtained:

$$\overline{O_s A_i} = [x_{Ai} - x_0, y_{Ai} - y_0, -f] \quad (1)$$

Figure 2:
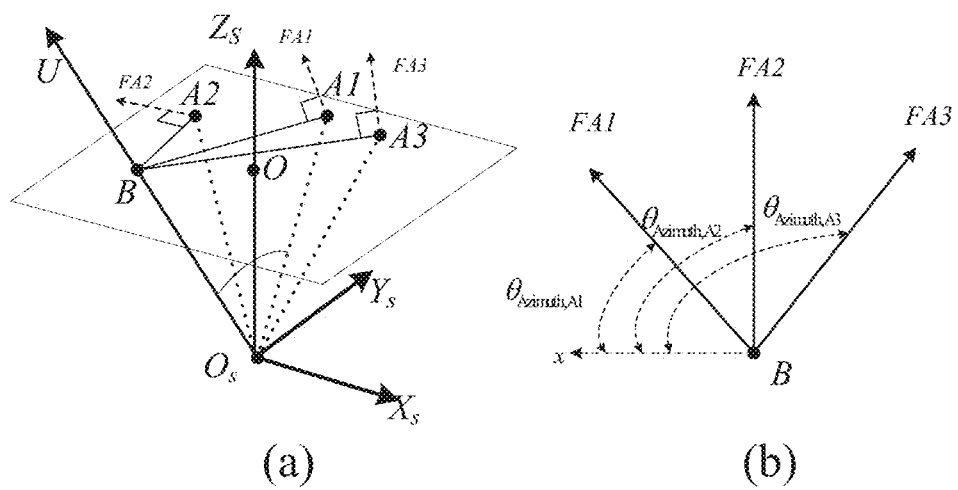
FIG. 2 is a schematic diagram of the collinearity of the refraction surface of the stellar atmosphere, wherein (a) is a schematic diagram of the refraction surface of the star, and (h) is a schematic diagram of the normal vector of the refraction surface.

In the formula, $(x_0, y_0)$ is the principal point of the star sensor, f is the focal length of the star sensor, and $O_s$ is the origin of the star sensor coordinate system, as shown in (a) in FIG. 2.

Based on the star recognition method, the angular distance between the observed stars is composed of two pairs of observed star vectors, and they are matched with the reference angular distance composed of the reference stars in the reference star catalog to obtain the angular distance in the star sensor. Matches between observed stars and reference stars in the reference catalog. The observed star in the star sensor corresponds to the reference star in the reference catalog.

Then, based on the International Astronomical Union (IAU) Basic Standards of Fundamental Astronomy (SOFA), the reference star corresponding to the observed star in the star sensor is converted from the reference star catalog coordinate system to the geographic coordinate system of the longitude and latitude of the observation position at the observation time t (East-North-Up). The reference vector before entering the atmosphere in the coordinate system) is:

$$V_i(\theta_{Zenith\_Ai}, \theta_{Azimuth\_Ai}) = R_2(90°-\lambda)R_3(\phi)W(t)R_3(-\beta) \\ R_2 f[g[u_B(t_0) + (t-t_0)\dot{u}_B(t_0) - \pi E_B(t)]] \quad (2)$$

In the formula, $\theta_{Zenith,Ai}$ and $\theta_{Azimuth,Ai}$ are the zenith distance and azimuth angle of the reference star before entering the atmosphere in the geographic coordinate system (East-North-Up coordinate system), respectively, t is the geomechanical time at the time of observation, $t_0$ is the reference epoch time of the Hipparcos Astronomical Catalogue $t_0$=J2000.0, and $u_B(t_0)$ is the position vector in the reference star $v_i$ the reference star catalog, $\bar{u}_B(t_0)$ is the stellar motion velocity (arcsec/year) at the stellar reference epoch $t_0$, $E_B(t)$ is the position ephemeris of the Earth in the International Celestial Coordinate System (JCRS) at the time t of observation, g[ . . . ] is the gravitational light deflection function, f[ . . . ] is the optical aberration function, $R_\Sigma$ is the precession-nutation transformation matrix, $R_3(-\beta)$ is the earth's rotation matrix, W(t) is the earth's polar shift matrix, $R_2(90°-\lambda)R_3(\phi)$ is the transformation matrix from the earth coordinate system to the geographic coordinate system, $R_1$, $R_2$ and $R_3$ represent the unit rotation angle matrix of x, y and z axes respectively.

As shown in FIG. 2(a), it is assumed that the theoretical position coordinate of the earth's zenith direction on the imaging plane of the star sensor is $B(x_B, y_B)$. According to the optical parameters of the star sensor, that is, the pixel size, focal length and principal point, the zenith direction vector $\overline{O_sB}$ of the earth is obtained:

$$\overline{O_sB}=[x_B-x_0, y_B-y_0, -f] \quad (3)$$

In the star sensor, the observed star vector $\overline{O_sA}$ and the earth's zenith direction vector $\overline{O_sB}$ form the atmospheric refraction surface $O_sA_iB$. The atmospheric refraction surfaces of different stars in the star sensor intersect at the zenith direction vector $\overline{O_sB}$ of the earth, that is, the refraction surfaces are collinear. Based on the observed star vector $\overline{O_sA_i}$ and the earth's zenith direction vector $\overline{O_sB}$, the normal vector $\overline{FAi}$ of the atmospheric refraction surface $O_sA_iB$ is:

$$\overline{FAi}=\overline{O_sAi} \times \overline{O_sB} \quad (4)$$

The angle between the refraction surfaces of the atmospheres of different observed stars is equal to the angle between their normal vectors. Because atmospheric refraction only changes the zenith angle of incident light without affecting its incident azimuth, the azimuth angle before and after atmospheric refraction of stellar does not change. Therefore, the angle between the normal vectors of the atmospheric refraction surface is equal to the angle between their azimuths before entering the atmosphere.

Suppose there are atmospheric refraction surfaces $O_sA_iB$ and $O_sA_jB$ of the i-th observed star and the j-th observed star in the star sensor, and their plane normal vectors are $\overline{FAi}$ and $\overline{FAj}$, respectively. The angle between the normal vector of the atmospheric refraction surface $O_sA_iB$ and $O_sA_jB$ satisfies the following formula:

$$\text{acos}\left(\frac{\overline{FAi} \cdot \overline{FAj}}{|\overline{FAj}||\overline{FAj}|}\right) = \theta_{Azimuth,Ai} - \theta_{Azimuth,Aj} \quad (5)$$

In the formula, $\theta_{Azimuth,Ai}$ and $\theta_{Azimuth,Aj}$ are the azimuth angles of the observed stars i and j before they enter the atmosphere, respectively.

As shown in (a) and (b) of FIG. 2, according to the angle between the atmospheric refraction surfaces of the three observed stars, the theoretical position coordinates $B(x_B, y_B)$ of the earth's zenith direction on the imaging plane of the star sensor can be solved as:

$$\begin{cases} \text{acos}\left(\frac{\overline{FA1} \cdot \overline{FA2}}{|\overline{FA1}||\overline{FA2}|}\right) = (\theta_{Azimuth,A1} - \theta_{Azimuth,A2}) \\ \text{acos}\left(\frac{\overline{FA1} \cdot \overline{FA3}}{|\overline{FA1}||\overline{FA3}|}\right) = (\theta_{Azimuth,A1} - \theta_{Azimuth,A3}) \\ \text{acos}\left(\frac{\overline{FA2} \cdot \overline{FA3}}{|\overline{FA2}||\overline{FA3}|}\right) = (\theta_{Azimuth,A2} - \theta_{Azimuth,A3}) \end{cases} \quad (6)$$

In the formula, $(\theta_{Azimuth,A1}, \theta_{Azimuth,A2}$ and $\theta_{Azimuth,A3}$ are the azimuth angles of the observed stars A1, A2 and A3 before they enter the atmosphere, respectively.

In theory, any three observed stars in the star sensor form a refracting surface triangle, and their calculated results should all be the same. However, the actual imaging process of the star sensor not only includes the atmospheric refraction error, but also includes the random noise error of the star sensor positioning system error and the atmospheric turbulence error. Therefore, it needs to be optimized to solve:

$$(x_B, y_B) = \arg\min \sum_{i \neq j=1}^{3} \left\| \text{acos}\left(\frac{\overline{FAi} \cdot \overline{FAj}}{|\overline{FAj}||\overline{FAj}|}\right) - (\theta_{Azimuth,Ai} - \theta_{Azimuth,Aj}) \right\|_2^2 \quad (7)$$

On the other hand, because the observed stars in different refracting surface triangles are affected by the random noise error of the star sensor positioning system error and the atmospheric turbulence error, the calculation results are different. The observed stars identified after the identification of N star images form $C_N^3$ groups of refracting surface triangles, and $C_N^3$ groups of calculation results are obtained. In addition to most of the results clustered within a small range of variation, there are also some singular values. However, for a star image, the observed stars are imaged at the same time, so the zenith direction of all observed stars in the entire star image is the same.

Therefore, the optimal solution of the refracting surface triangle composed of all the observed stars in the star image can be obtained, so that the theoretical position coordinates $\overline{B}$ of the optimal Earth zenith direction of the entire star image on the imaging surface of the star sensor can be obtained:

$$(\overline{x_B}, \overline{y_B}) = \quad (8)$$
$$\arg\min \sum_{n=1}^{M} \left( \sum_{ni \neq nj=1}^{3} \left\| \text{acos}\left(\frac{\overline{FA_{ni}} \cdot \overline{FA_{nj}}}{|\overline{FA_{ni}}||\overline{FA_{nj}}|}\right) - (\theta_{Azimuth,Ani} - \theta_{Azimuth,Anj}) \right\| \right)$$

In the formula, $n_i$ and $n_j$ are the numbers of the observed stars in the refraction surface triangle, and n is the number of the refraction surface triangle formed by the observed stars identified after the star recognition. If there are N observed stars recognized after the star recognition, t, the number of refraction surface triangles M=$C_N^3$.

Figure 3:
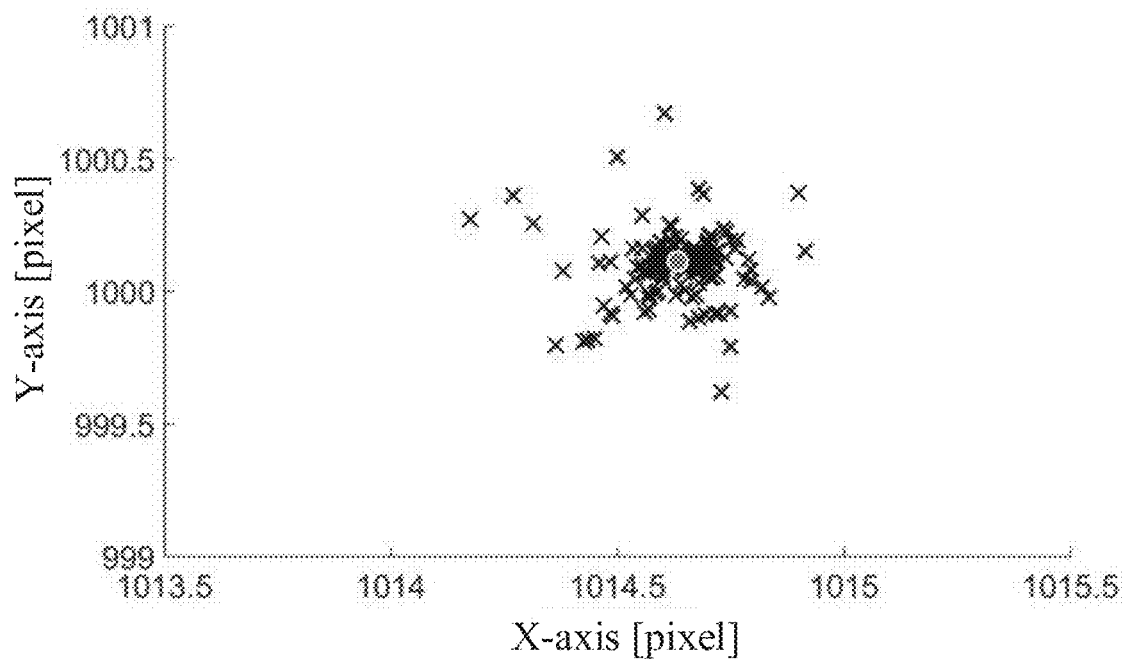
FIG. 3 is a schematic diagram of atmospheric refraction correction.

According to Equation (7) and Equation (8), FIG. 3 shows the 16 observed stars in a frame of measured star image after star identification, and obtained the zenith direction of the Earth with different refraction surface triangles on the imaging surface of the star sensor. The theoretical position coordinate B $x_B$, $y_B$) is denoted as 'x', and the theoretical position coordinate $\overline{B}(\overline{x_B}, \overline{y_B})$ of the optimal Earth zenith direction of the entire star image on the imaging plane of the star sensor is denoted as 'o'.

Figure 4:
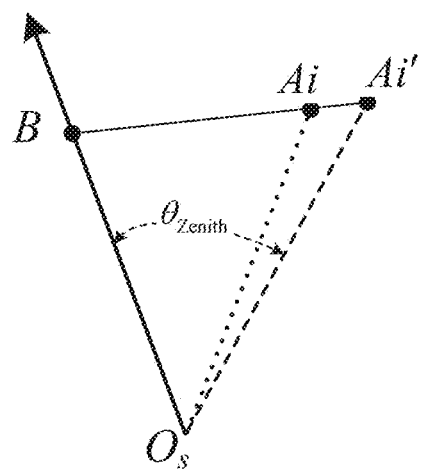
FIG. 4 shows the coordinates of point B and the optimization results obtained by solving different refracting surface triangles of a frame of star image.

Then, the atmospheric refraction corrections are made for all observed stars in the star sensor. Since the azimuth angle of the incident stellar does not change before and after atmospheric refraction, the azimuth angle of the observed star before and after atmospheric refraction correction is the same. As shown in FIG. 4, the position coordinates $A_i(x_A, y_A)$ of the i-th observed star on the star sensor imaging plane, the position coordinates $A'_i(x'_A, y'_A)$ after atmospheric refraction correction and the theoretical position coordinates $B(x_B, y_B)$ of the earth's zenith direction on the star sensor imaging plane are collinear with three points, which is:

$$\overline{BA_i} \cdot \overline{BA'_i} = (x_A - x_B)(y'_A - y_B) - (y_A - y_B)(x'_A - x_B) = 0 \quad (9)$$

According to formula (2), the zenith distance of the i-th observed star on the imaging surface of the star sensor before entering the atmosphere is $\theta_{Zenith, Ai}$, and the position $A'_i(x'_A, y'_A)$ after atmospheric refraction correction is obtained by solving the triangular cosine law:

$$|A_i A'_i|^2 = |O_s A_i|^2 + |O_s A'_i|^2 - 2|O_s A'_i|\cos(\theta_{Zenith, Ai} - \angle BO_s A_i) \quad (10)$$

In the formula, $A_i A'_i$ is the distance between the coordinates $A_i(x_A, y_A)$ and $A'_i(x'_A, y'_A)$, $O_s A_i$ and $O_s A'_i$ are the distance from the coordinates $A_i(x_A, y_A)$ and $A'_i(x'_A, y'_A)$ to the origin of the star sensor coordinate system $Os$, respectively, and $\angle BO_s A_i$ is the angle between the vector $\overline{O_s B}$ and $\overline{O_s A_i}$.

Simultaneous equations (9) and (10) form a system of equations, and the theoretical position coordinates $A'_i(x'_A, y'_A)$ of the observed star i on the imaging plane of the star sensor are obtained after removing atmospheric refraction. Similarly, performing atmospheric refraction correction on other observed stars in the star sensor to obtain the theoretical position coordinates after removing atmospheric refraction. According to the optical parameters of the star sensor, that is, the pixel size, focal length and principal point, the observed star vector $\overline{O_s A_i}$ of the observed star in the star sensor coordinate system after atmospheric refraction correction is obtained:

$$\overline{O_s A'_i} = [x'_{Ai} - x_0, u'_{Ai} - y_0, -f] \quad (11)$$

By the star identification method, the observed star $A_i$ in the star sensor corresponds to the reference star $V_i$ in the reference star catalog. Therefore, using the observed star vector corrected by atmospheric refraction and its corresponding reference star vector in the reference star catalog, the attitude transformation matrix $C_s^m$ of the star sensor in the geographic coordinate system is calculated:

$$\overline{O_s A'_i} = C_s^m V_i(\theta_{Zenith, Ai}, \theta_{Azimuth, Ai}) \quad (12)$$

In the formula, $V_i(\theta_{Zenith, Ai}, \theta_{Azimuth, Ai})$ is the position vector of the reference star corresponding to the observed star in the geographic coordinate system.

2. Embodiment Effect

The invention is applied to the stellar atmospheric refraction correction of the star sensor in the atmosphere, and realizes the real-time correction of the position coordinates of all identified stars during the observation process of the star sensor, thereby obtaining accurate attitude information of the star sensor.

In order to verify the correctness and effectiveness of the present invention, an outfield night-sky test was carried out at the Xinglong National Astronomical Observatory in Hebei. The specific content of the test is as follows:

Continuously collect 1000 frames of star images, and perform star identification on the centroid positioning results of each frame of star images to obtain the reference stars corresponding to the observed stars in the reference star list.

Then, use the atmospheric refraction method proposed in the present invention to perform atmospheric refraction correction on the identified stars. In order to verify the atmospheric refraction effect of the present invention, the average value of the observed star angular distance and the reference star angular distance composed of all stars before and after the atmospheric refraction correction in each star image is compared.

Figure 5:
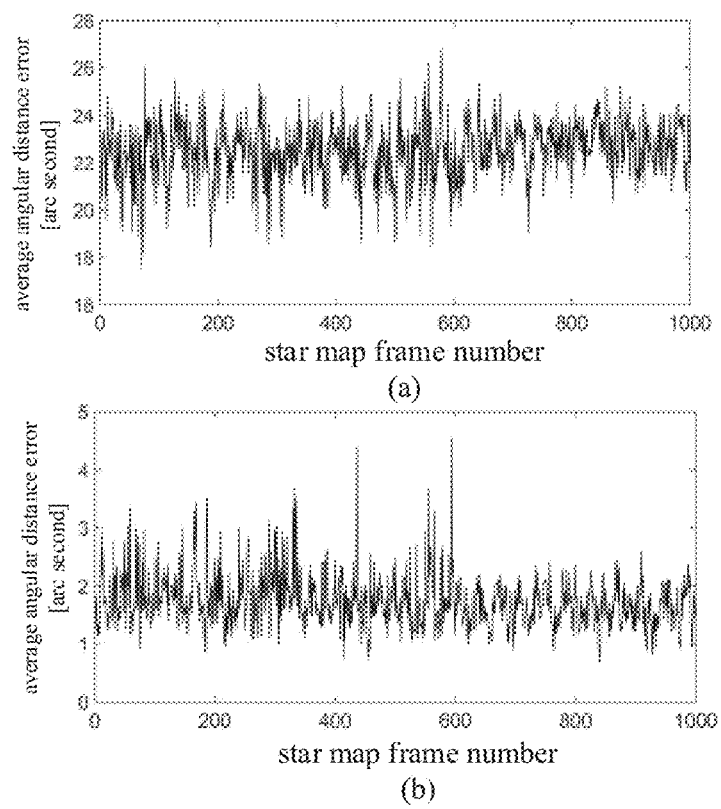
FIG. 5 shows the average angular distance deviation before and after atmospheric refraction correction for 1000 frames of experimental star images, (a) is a schematic diagram of the average angular distance deviation before atmospheric refraction correction, and (b) is a schematic diagram of the average angular distance deviation after atmospheric refraction correction.

FIG. 5 shows the average angular distance deviation before and after atmospheric refraction correction for 1000 frames of experimental star images. FIG. 5(a) is the average angular distance deviation before atmospheric refraction correction, the standard deviation is 1.2713 arc seconds, and the mean is 22.483 arc seconds. FIG. 5(b) is the average angular distance deviation after atmospheric refraction correction, the standard deviation is 0.4643 arc seconds, and the mean is 1.7346 arc seconds.

The results show that the stellar atmospheric refraction correction method based on the collinear refraction surface proposed in the present invention is effective and has high atmospheric refraction correction accuracy, which can effectively improve the attitude measurement accuracy of the ground observation star sensor.

The above embodiments are provided for the purpose of describing the present invention only, and are not intended to limit the scope of the present invention. The scope of the invention is defined by the appended claims. Various equivalent replacements and modifications made without departing from the spirit and principle of the present invention should be included within the scope of the present invention.

What is claimed is:

1. A method for measuring and correcting stellar atmospheric refraction based on collinear refraction surfaces; characterized in that it comprises the following steps:

Step 1, based on a star identification method, obtaining a matching relationship between an observation star in the star sensor and a reference star in a reference star catalogue according to the position coordinates of the observation star on the imaging plane of the star sensor and the reference star catalogue;

Step 2, according to the first star identification result and the observation time and the observation position, converting the direction vector of the reference star corresponding to the observation star in the star sensor from the reference star coordinate system into a geographic coordinate system before entering the atmosphere layer; ie, the East-North-Up coordinate system, to obtain the zenith distance-altitude and the azimuth angle before entering the atmosphere layer, Step 3, based on the stellar atmospheric refraction surface collinear principle According to the position coordinates of the observed star on the imaging plane of the star sensor and the azimuth angle of the stellar obtained in the second step before entering the atmosphere layer, the position coordinates of the top direction of the earth on the imaging surface of the star sensor are solved;

Step 4, performing atmospheric refraction correction on the coordinates of all the observation stars in the star sensor on the imaging plane after the star is identified according to the position coordinates of the earth top direction obtained in the third step and the sky top distance before the stellar obtained in the second step enters the atmosphere layer, so as to obtain theoretical position coordinates of all observed stars on the imaging surface of the star sensor after the atmospheric refraction is removed;

Step 5, according to the calculated theoretical position coordinates of all the observation stars on the imaging surface of the star sensor after the atmospheric refraction is removed in the fourth step, the matching relationship between the star and the reference star in the first step, and the direction vector of the reference star in the geographic coordinate system in the second step, the attitude of the star sensor in the geographic coordinate system is solved.

2. The stellar atmospheric measuring and correcting method based on collinear refraction surfaces according to claim 1; wherein in the first step, the star recognition implementation steps are as follows:

(a1) setting the position coordinates of the ith observation star on the imaging surface of the star sensor as $A_i(x_A, y_A)$, and obtaining an observation star vector of the observation star in the star sensor coordinate system according to the optical parameters of the star sensor, namely the size, the focal length and the main point of the star sensor $\overline{O_sA_i}$, wherein OS is the origin of the star sensor coordinate system;

(a2) observing the inter-satellite angular distance between two observation star vectors based on the star identification method, and matching them with the reference angular distance formed by the reference star in the reference star catalogue to obtain the matching relationship between the observation star in the star sensor and the reference star in the reference star catalogue.

3. The stellar atmospheric measuring and correcting method based on collinear refraction surfaces according to claim 1, wherein in the second step, the antenna top distance and the azimuth angle of the incident stellar before entering the atmosphere layer are implemented as follows:

(b1) obtaining the observation time of the star sensor and the longitude and latitude of the observation position, and converting the observation time to the earth mechanics time;

(b2) taking out the position vector of the reference star matched with the observation star in the star sensor from the reference star table according to the result of the first star identification and the related astronomical parameters thereof, wherein the astronomical parameters comprise the red warp, the red weft, the sun and the parallax;

(b3) based on the International Astronomical Union (IAU) basic Standards of Fundamental Astronomy (SOFA), observing the observation time and the observation position and substituting the reference star position vector and the related astronomical parameters of the star into an astronomical conversion formula, and calculating to obtain a position vector of the reference star matched with the observation star in the star sensor in a geographic coordinate system, ie, the East-North-Up coordinate system, before entering the atmosphere layer, wherein the vector is represented by the antenna top distance and the azimuth angle.

4. The stellar atmospheric measuring and correcting method based on collinear refraction surfaces according to claim 1, characterized in that: in the third step, the steps of obtaining the position coordinates of the zenith direction of the earth on the imaging plane of the star sensor are as follows:

(c1) setting the theoretical position coordinates of the top direction of the earth on the imaging surface of the star sensor as $B(x_B, y_B)$, and obtaining the direction vector of the top direction of the earth in the star sensor coordinate system according to the optical parameters, namely the size, the focal length and the main point of the star sensor $\overline{O_sB}$;

(c2) the ith observed star vector $\overline{O_sA_i}$ in the star sensor and the direction vector $\overline{O_sB}$ of the earth's zenith form the atmospheric refraction surface $O_sA_iB$, the vector of the refraction surface method is $\overline{FA_i} = \overline{O_sA_i} \times \overline{O_sB}$, the atmospheric refraction surfaces of different stars in the star sensor intersect with the earth's zenith direction vector $\overline{O_sB}$, that is, the refraction face collinear;

(c3) the angle between the atmospheric refraction surfaces $O_sA_iB$ and $O_sA_jB$ of the i-th observed star and the j-th observed star in the star sensor is equal to the angle between their normal vectors, since the azimuth angle does not change before and after the atmospheric refraction of the stellar, the angle between the normal vectors of the atmospheric refraction surfaces $O_sA_iB$ and $O_sA_jB$ is equal to the angle between the azimuth angles before the observed stars i and j enter the atmosphere, namely: a $\cos(\overline{FAi} \cdot \overline{FAj}/|\overline{FAj}||\overline{FAj}|) = \theta_{Azimuth,Ai} - \theta_{Azimuth,Aj}$, where $\theta_{Azimuth,Ai}$ and $\theta_{Azimuth,Aj}$ are azimuth angles of the observed stars i and j before they enter the atmosphere obtained in the second step;

(c4) any three observation stars in the star sensor form a refraction surface triangle, and the refractive surface triangles form a least square error model, namely, $$\sum_{i \neq j=1}^{3} \left\| \mathrm{acos}(\overline{FAi} \cdot \overline{FAj}/|\overline{FAj}||\overline{FAj}|) - (\theta_{Azimuth,Ai} - \theta_{Azimuth,Aj}) \right\|_2^2;$$

(c5) all observed stars in the star sensor form $C_N^3$ groups of refracting triangles, where N is the number of observed stars identified after star recognition, the least squares error model of all the refractive surface triangles in the star sensor is accumulated to obtain a position coordinate solving model of the top direction of the earth on the imaging surface of the star sensor, that is, $$(\overline{x_B}, \overline{y_B}) = \arg\min \sum_{n=1}^{M} \left( \sum_{i \neq j=1}^{3} \left\| \mathrm{acos}(\overline{FAi} \cdot \overline{FAj}/|\overline{FAj}||\overline{FAj}|) - (\theta_{Azimuth,Ai} - \theta_{Azimuth,Aj}) \right\|_2^2 \right)$$

in the formula $M = C_n^3$; Finally, theoretical position coordinates of the optimal earth top direction of the whole star image on the imaging surface of the star sensor are obtained $B(\overline{x_b}, \overline{y_b})$.

5. The stellar atmospheric measuring and correcting method based on collinear refraction surfaces according to claim 1, characterized in that: in the fourth step, an observation sun in the star sensor is subjected to atmospheric refraction correction to obtain theoretical position coordinates of all observed stars on the imaging surface of the star sensor after the atmospheric refraction is removed, and the steps are as follows:

(d1) the azimuth angle of the i-th observation sun on the imaging surface of the star sensor is $A_i(x_A, y_A)$ and the position coordinates after atmospheric refraction correction are the same as the azimuth angle of the $A'_i(x'_A, y'_A)$, on the imaging surface of the star sensor, the position coordinates $A_i(x_A, y_A)$, $A'_i(x'_A, y'_A)$ and the theoretical position coordinates $B(x_B, y_B)$ on the imaging plane of the star sensor are collinear, that is, $\overline{BA_i'} \cdot \overline{BA_i^r} = 0$;

(d2) setting the top distance of the i-th observation star on the imaging surface of the star sensor in the second step as $\theta_{Zenith,Ai}$, and according to the cosine theorem $|A_i A_i'|^2 = |O_s A_i|^2 + |O_s A_i'|^2 - 2|O_s A_i||O_s A_i^{r'}|\cos(\theta_{Zenith,Ai} - \angle BO_s A_i)$;

(d3) the above-mentioned implementation steps (d1) and (d2) are combined to form a system equation set, and theoretical position coordinates $A_i'(x_A', y_A')$ of the observation sun i on the imaging surface of the star sensor after the atmospheric refraction is removed are solved;

(d4) atmospheric refraction correction is carried out on other observation stars in the star sensor according to steps (d1), (d2) and (d3), so that theoretical position coordinates after atmospheric refraction are removed.

6. The stellar atmospheric measuring and correcting method based on collinear refraction surfaces according to claim 1, wherein the step of solving the attitude of the star sensor in the geographic coordinate system comprises the following steps:

(e1) obtaining the direction vector of the star i under the star sensor coordinate system after atmospheric refraction correction according to the optical parameters of the star sensor, namely the size, the focal length and the main point of the star sensor $\overline{O_s A_i^r}$;

(e2) obtaining the attitude of the star sensor in the geographic coordinate system by using the attitude solving method according to the matching relationship between the observation star in the star sensor in the first step and the reference star in the reference star table and the position vector before the reference star enters the atmosphere in the geographic coordinate system in the second step.

\* \* \* \* \*